United States Patent
Park (10) Patent No.: US 10,041,744 B2
(45) Date of Patent: Aug. 7, 2018

(54) HEAT EXCHANGER FOR RECOVERY OF WASTE HEAT

(71) Applicant: In Kyu Park, Suwon-si (KR)

(72) Inventor: In Kyu Park, Suwon-si (KR)

( * ) Notice: Subject to any disclaimer, the term of this patent is extended or adjusted under 35 U.S.C. 154(b) by 0 days.

(21) Appl. No.: 15/493,445

(22) Filed: Apr. 21, 2017

(65) Prior Publication Data

US 2018/0010863 A1 Jan. 11, 2018

(30) Foreign Application Priority Data

Jul. 11, 2016 (KR) .................. 10-2016-0087486

(51) Int. Cl.
| | |
|---|---|
| F28F 9/02 | (2006.01) |
| F28D 21/00 | (2006.01) |
| F28D 7/16 | (2006.01) |
| F28F 9/16 | (2006.01) |
| F28F 21/08 | (2006.01) |

(52) U.S. Cl.
CPC .......... *F28D 21/0007* (2013.01); *F28D 7/16* (2013.01); *F28D 7/1653* (2013.01); *F28D 21/0003* (2013.01); *F28F 9/16* (2013.01); *F28F 21/086* (2013.01); *F28F 2275/125* (2013.01)

(58) Field of Classification Search
CPC ...... F28D 21/0007; F28D 7/16; F28D 7/1653; F28D 21/0003; F28D 9/22; F28F 9/16; F28F 21/086; F28F 2275/125; F28F 9/0229; F25B 39/028; F17D 5/04
USPC ..................................................... 165/158
See application file for complete search history.

(56) References Cited

U.S. PATENT DOCUMENTS

| | | | | | |
|---|---|---|---|---|---|
| 4,871,014 | A | * | 10/1989 | Sulzberger | ............. F17D 5/04 165/158 |
| 5,141,049 | A | * | 8/1992 | Larsen | ..................... F28F 9/22 165/133 |
| 5,979,545 | A | * | 11/1999 | Pierce | ................... F28F 9/0229 165/134.1 |
| 2010/0031698 | A1 | * | 2/2010 | Higashiyama | ........ F25B 39/028 62/525 |

FOREIGN PATENT DOCUMENTS

| | | |
|---|---|---|
| JP | H05-099586 A | 4/1993 |
| JP | 2002-168586 A | 6/2002 |
| KR | 10-1198238 B1 | 11/2012 |
| KR | 10-2013-0048919 A | 5/2013 |

* cited by examiner

*Primary Examiner* — Davis Hwu (74) *Attorney, Agent, or Firm* — Korus Patent, LLC; Seong Il Jeong (57) ABSTRACT

Disclosed herein is a heat exchanger for the recovery of waste heat. The heat exchanger includes: a bottom plate configured such that an exhaust gas inlet is formed therethrough; a top plate configured such that an exhaust gas outlet is formed therethrough at a location opposite that of the exhaust gas inlet; a first side plate configured such that a plurality first side through holes is formed therethrough; a second side plate configured such that a plurality of second side through holes is formed therethrough at locations opposite those of the first side through holes; a third side plate and a fourth side plate configured to connect the first side plate and the second side plate; and a plurality of heat exchange tubes formed as titanium material tubes, and configured to connect parallel between the first side through holes and the second side through holes.

6 Claims, 10 Drawing Sheets

HEAT EXCHANGER FOR RECOVERY OF WASTE HEAT

BACKGROUND

1. Technical Field

The present invention relates generally to a heat exchanger for the recovery of waste heat, and more particularly to a heat exchanger for the recovery of waste heat, which recovers waste heat from exhaust gas generated in a boiler and then performs heat exchange.

2. Description of the Related Art

Exhaust gas that is generated in a boiler is discharged at a temperature of about 200-250° C. and is then discarded to the atmosphere, thereby incurring significant heat loss. Heat loss attributable to high-temperature exhaust gas ranges from about 10% to about 20%, and thus the efficiency of the boiler is reduced to 80% or less.

Accordingly, by using a system for the recovery of waste heat, thermal energy is recovered using exhaust gas generated during the operation of the boiler and is then used for the supply of hot water or heating. A system for the recovery of waste heat refers to a system that uses exhaust gas, generated in a boiler, for the supply of hot water or heating. While a boiler is being operated, high-temperature exhaust gas is discharged through a chimney and is then discarded to the atmosphere. In other words, a system for the recovery of waste heat refers to a system that recovers thermal energy through heat exchange by using a heat exchanger for the recovery of waste heat and uses the thermal energy for the supply of hot water or heating.

Figure 1:
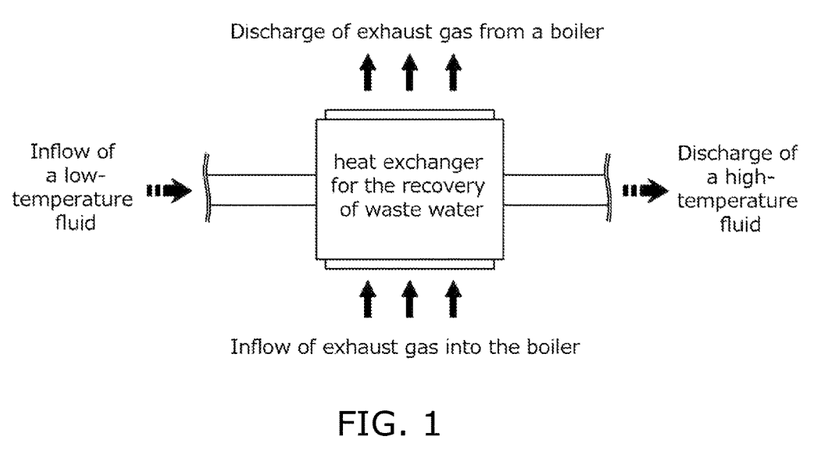
FIG. 1 is a view showing the concept of a heat exchange system for the recovery of waste heat.

As shown in FIG. 1, a system for the recovery of waste heat having desirable heat transfer efficiency is installed between the flue of a boiler and an exhaust gas exit. Accordingly, waste heat can be recovered through heat exchange between high-temperature exhaust gas at a temperature of 200-250° C. and cold water at a temperature of about 10-15° C. in a counter-flow manner, and then the exhaust gas cooled down to a temperature of about 40-50° C. is discharged to the flue, thereby reducing fuel costs.

Generally, during a combustion reaction in a boiler, sulfur dioxide gas is generated due to a sulfuric component and combines with oxygen to thus form sulfuric anhydride, and the sulfuric anhydride reacts with moisture to thus form sulfuric acid. The sulfuric acid has significantly high corrosiveness, and thus corrodes a material, thereby reducing lifespan (in particular, low-temperature corrosion occurs at a temperature equal to or lower than 170° C.)

Accordingly, boilers using fuel including a sulfuric component take the discharge of exhaust gas at a temperature equal to or higher than a low-temperature corrosiveness point of 170° C. for granted due to concern about low-temperature corrosion. As a result, a problem arises in that the recovery of waste heat is limited because the waste heat of exhaust gas at a temperature lower than 170° C. cannot be recovered.

PRIOR ART DOCUMENT

Patent Document

Patent document 1: Korean Patent No. 10-1198238

SUMMARY

An object of the present invention is to provide a heat exchanger for the recovery of waste heat, which has heat exchange tubes made of a material which is not corroded by the exhaust gas of a boiler.

Another object of the present invention is to solve the problem in which heat exchange tubes made of an incorrodible material cannot be fastened through welding.

According to an aspect of the present invention, there is provided a heat exchanger for the recovery of waste heat, which is configured to recover the thermal energy of exhaust gas generated in a boiler and heats water, the heat exchanger including: a bottom plate configured such that an exhaust gas inlet is formed therethrough; a top plate configured such that an exhaust gas outlet is formed therethrough at a location opposite that of the exhaust gas inlet; a first side plate configured such that a plurality first side through holes is formed therethrough; a second side plate disposed opposite the first side plate, and configured such that a plurality of second side through holes is formed therethrough at locations opposite those of the first side through holes; a third side plate and a fourth side plate configured to connect the first side plate and the second side plate; and a plurality of heat exchange tubes formed as titanium material tubes through which a fluid flows, and configured to connect parallel between the first side through holes and the second side through holes opposite the first side through holes.

The heat exchange tubes may be fastened to the first side plate by inserting the first ends thereof into the first side through holes and expanding the first ends, and may be fastened to the second side plate by inserting the second ends thereof into the second side through holes and expanding the second ends.

The heat exchange tubes through which the fluid is supplied may be grouped into a plurality of sections according to the capacity of the boiler.

According to an aspect of the present invention, there is provided a method of manufacturing a heat exchanger for the recovery of waste heat, which is configured to manufacture a heat exchanger for the recovery of waste heat configured to recover the thermal energy of exhaust gas generated in a boiler and heat water and to include a housing including a bottom plate, a top plate, a first side plate, a second side plate, a third side plate, and a fourth side plate, the method including: an exhaust gas inlet formation step of forming an exhaust gas inlet through the bottom plate; an exhaust gas outlet formation step of forming an exhaust gas outlet through the top plate at a location opposite the exhaust gas inlet; a first side through hole formation step of forming a plurality of first side through holes through the first side plate; a second side through holes formation step of forming a plurality of second side through holes through the second side plate at locations opposite those of the first side through holes; a heat exchange tube first end expansion and fastening step of fastening the first ends of the heat exchange tubes made of a titanium material to the first side plate, through which the plurality of first side through holes have been formed, by expanding the first ends of the heat exchange tubes; a heat exchange tube second end expansion and fastening step of fastening the second ends of the heat exchange tubes to the second side plate, through which the plurality of second side through holes are formed at locations opposite those of the first side through holes, by expanding the second ends of the heat exchange tubes; and a step of coupling the bottom plate, the top plate, the first side plate, the second side plate, the third side plate, and the fourth side plate to one another.

The heat exchange tube first end expansion and fastening step may include the steps of: inserting the first ends of the heat exchange tubes made of a titanium material into the first side plate through which the plurality of first side through holes has been formed; and fastening the outer circumferences of the first ends of the heat exchange tubes into the outer circumferences of the first side through holes by expanding the outer circumferences of the first ends of the heat exchange tubes through the application of a preset tube expansion pressure onto the insides of the first ends of the heat exchange tubes.

The heat exchange tube second end expansion and fastening step may include the steps of: inserting the second ends of the heat exchange tubes into the second side plate through which the plurality of second side through holes has been formed at locations opposite those of the first side through holes; and fastening the outer circumferences of the second ends of the heat exchange tubes into the outer circumferences of the second side through holes by expanding the outer circumferences of the second ends of the heat exchange tubes through the application of a preset tube expansion pressure onto the insides of the second ends of the heat exchange tubes.

The heat exchange tube first end expansion and fastening step and the heat exchange tube second end expansion and fastening step may be concurrently performed on each of the heat exchange tubes by using an identical tube expansion pressure.

The first side plate and the second side plate may be made of a metallic material, and the expansion may be performed using a tube expansion pressure lower than the deformation pressure of the first side plate and the second side plate made of the metallic material.

A heat exchanger for the recovery of waste heat may be performed by using any one of the methods of manufacturing a heat exchanger for the recovery of waste heat.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The advantages and features of the present invention and methods for implementing the advantages and the features will be apparent from embodiments that will be described with reference to the accompanying drawings in detail. However, the present invention is not limited to the embodiments that will be described below, and will be implemented in various different forms. The embodiments are provided merely to assist those having ordinary knowledge in the art to which the present invention pertains in fully understanding the scope of the invention. The present invention is defined only by the scopes of the attached claims. Furthermore, in the following description of the present invention, detailed descriptions of related well-known technologies that are determined to make the gist of the present invention obscure will be omitted.

Figure 2:
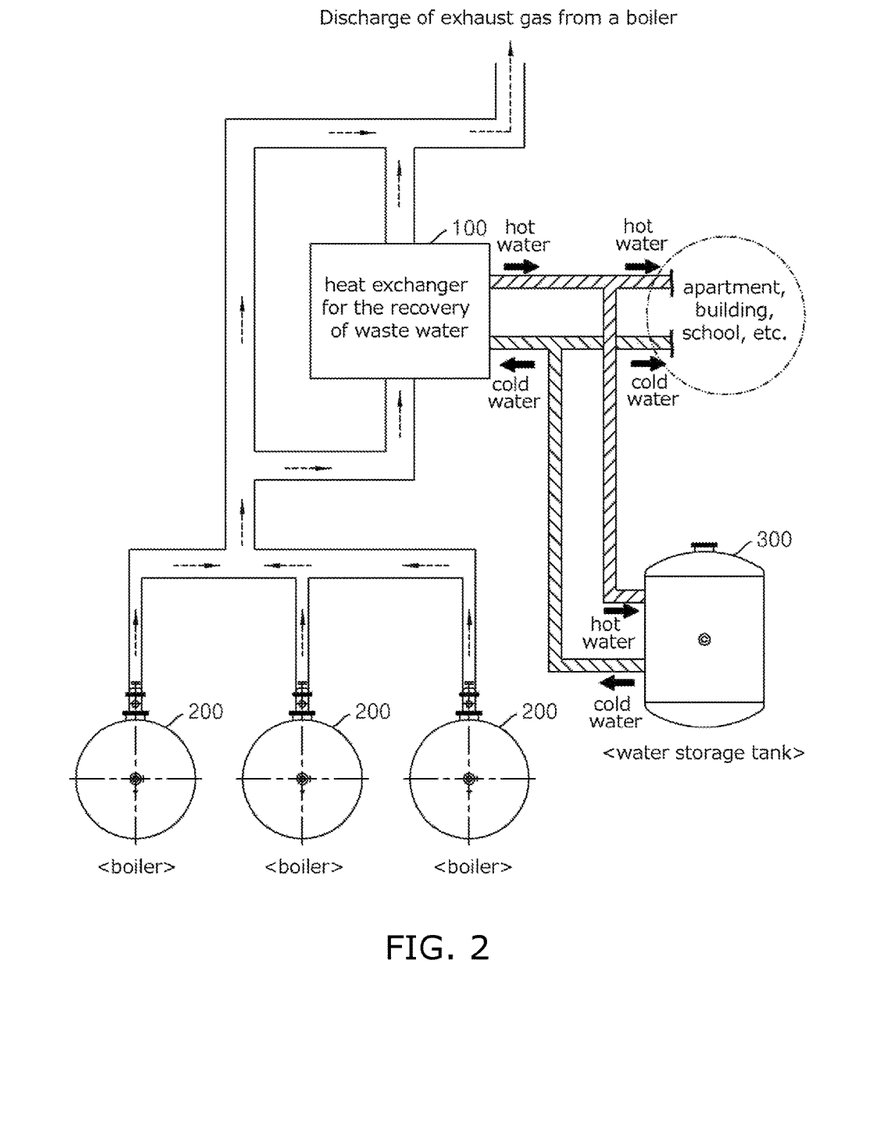
FIG. 2 is a view showing a heat exchange system for the recovery of waste heat according to an embodiment of the present invention.
Figure 3:
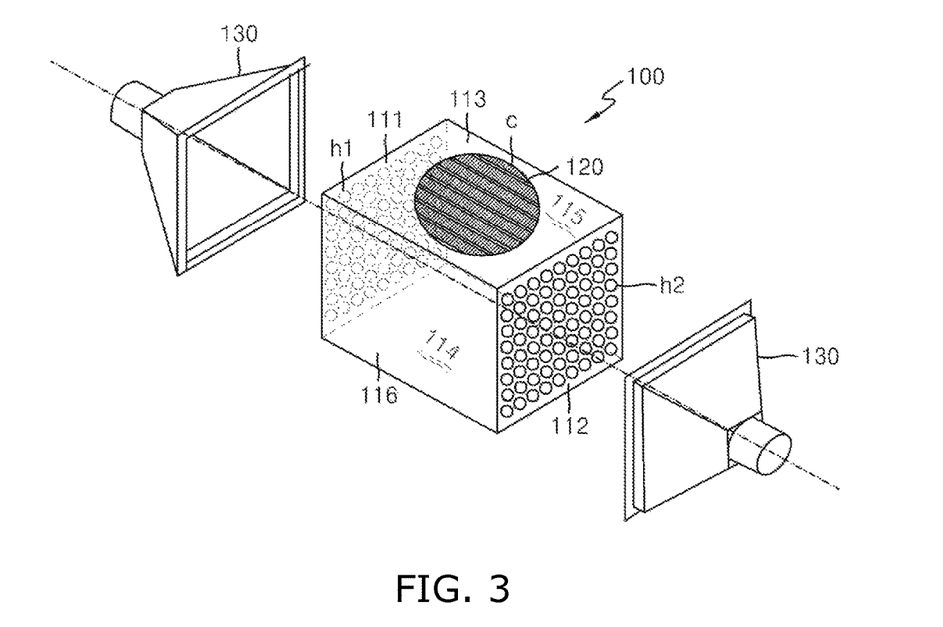
FIG. 3 is a view showing a heat exchanger for the recovery of waste heat according to an embodiment of the present invention.
Figure 4:
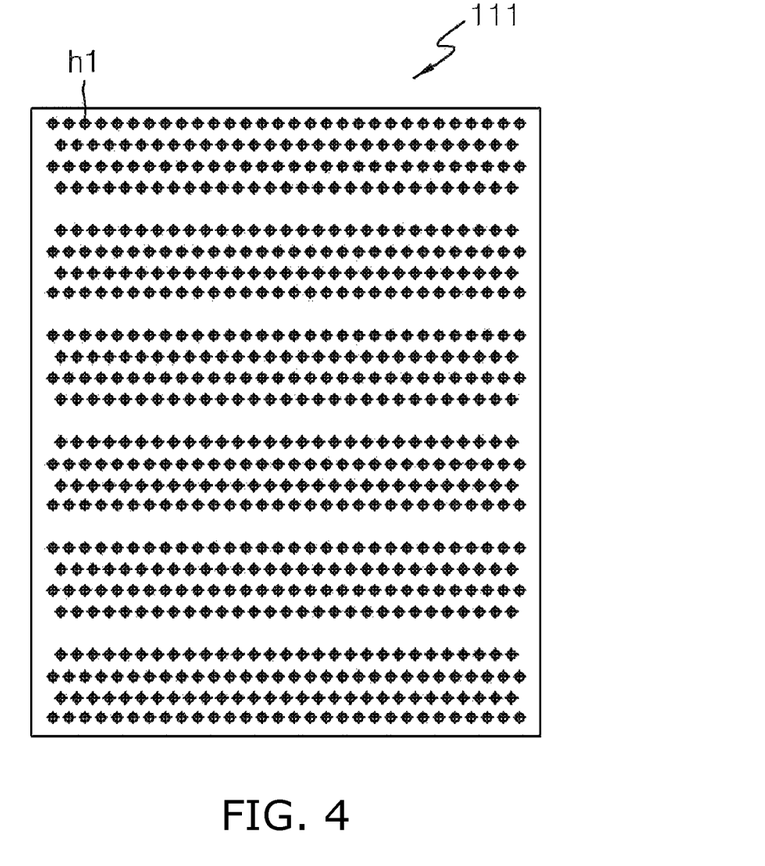
FIG. 4 is a view showing a first side plate through which a plurality of first side through holes has been formed according to an embodiment of the present invention.
Figure 5:
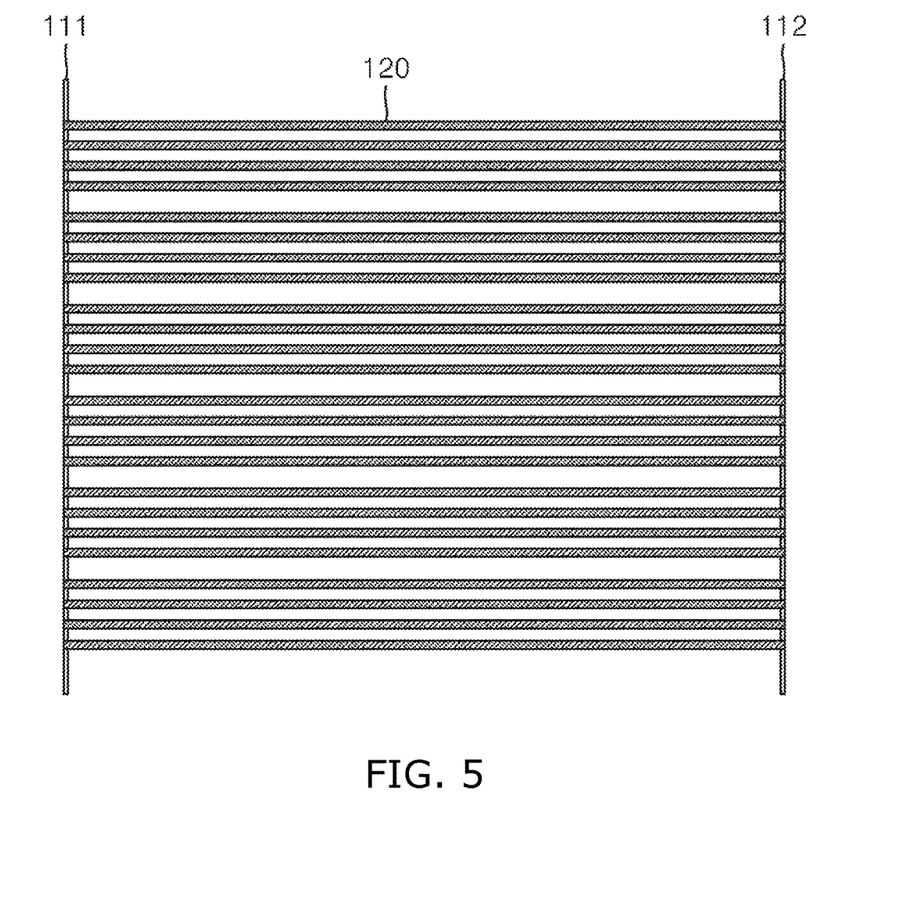
FIG. 5 is a view showing a plurality of heat exchange tubes disposed parallel between a first side plate and a second side plate according to an embodiment of the present invention.
Figure 6:
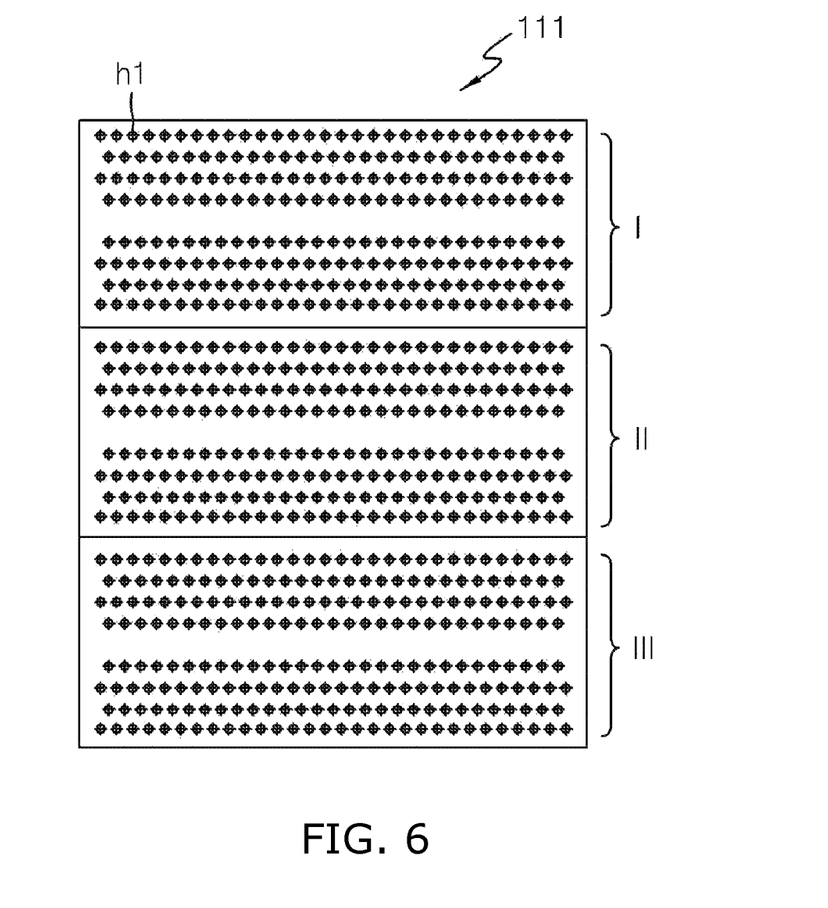
FIG. 6 is a view showing the state in which a plurality of first side through holes is grouped to a plurality of sections according to an embodiment of the present invention.

FIG. 2 is a view showing a heat exchange system for the recovery of waste heat according to an embodiment of the present invention, FIG. 3 is a view showing a heat exchanger for the recovery of waste heat according to an embodiment of the present invention, FIG. 4 is a view showing a first side plate through which a plurality of first side through holes has been formed according to an embodiment of the present invention, FIG. 5 is a view showing a plurality of heat exchange tubes disposed parallel between a first side plate and a second side plate according to an embodiment of the present invention, and FIG. 6 is a view showing the state in which a plurality of first side through holes is grouped to a plurality of sections according to an embodiment of the present invention.

A heat exchange system for the recovery of waste heat includes a waste heat recovery heat exchanger 100, boilers 200, and a water storage tank 300.

As shown in FIG. 2, when fuel is burnt in the boilers 200 and exhaust gas is discharged at a high-temperature of 200-250° C., the waste heat recovery heat exchanger 100 recovers waste heat through heat exchange with cold water at a temperature of about 10-15° C. provided by water storage tank 300, the exhaust gas cooled down to a temperature of about 40-50° C. is discharged, and heated hot water is used for the water storage tank 300 or heating. In this case, the water storage tank 300 is a fluid storage water tank configured to store a fluid, such as water or the like.

The waste heat recovery heat exchanger 100 according to the present invention is shown in FIG. 3. The waste heat recovery heat exchanger 100 configured to recover the thermal energy of exhaust gas generated in the boilers 200 and heat water includes a bottom plate 114, a top plate 113, a first side plate 111, a second side plate 112, a third side plate 115, a fourth side plate 116, and heat exchange tubes 120. The waste heat recovery heat exchanger 100 may further include fluid mixing headers 130.

The bottom plate 114 is the plate of the bottom surface of the waste heat recovery heat exchanger 100. An exhaust gas inlet is formed through the bottom plate 114. The high-temperature exhaust gas generated in the boilers 200 enters the inside of the waste heat recovery heat exchanger 100 through the exhaust gas inlet.

The top plate 113 is the plate of the top surface of the waste heat recovery heat exchanger 100. An exhaust gas outlet is formed through the top plate 113 at a location opposite that of the exhaust gas inlet. The exhaust gas having entered through the exhaust gas inlet, having exchanged heat with the heat exchange tubes 120 and having been cooled down to a low temperature is discharged through the exhaust gas outlet.

The exhaust gas inlet and the exhaust gas outlet may have various shapes, such as a circular shape, a rectangular shape, a hexagonal shape, etc. Furthermore, the exhaust gas inlet and the exhaust gas outlet preferably have the same shape and the same opening area. The reason for this is that the mount of exhaust gas to enter the waste heat recovery heat exchanger 100 and the amount of exhaust gas to be discharged from the waste heat recovery heat exchanger 100 are the same, and thus the exhaust gas inlet and the exhaust gas outlet are made to have the same shape and the same opening area.

The first side plate 111 is the plate of the first side surface of the waste heat recovery heat exchanger 100. A plurality of first side through holes h1, i.e., a plurality of through holes, is formed through the first side plate 111. The plurality of first side through holes h1 is formed to have a diameter larger than that of the first ends of the heat exchange tubes 120 so that the first ends of the heat exchange tubes 120 can be inserted into the first side through holes h1. For reference, FIG. 4 shows the first side plate 111 through which the plurality of first side through holes h1 has been formed.

The second side plate 112 is the plate of the second side surface of the waste heat recovery heat exchanger 100, and is opposite to the first side plate 111. A plurality of second side through holes h2 is formed through the second side plate 112 at locations opposite those of the first side through holes h1. In the same manner, the plurality of second side through holes h2 is formed to have a diameter larger than that of the second ends of the heat exchange tubes 120 so that the second ends of the heat exchange tubes 120 can be inserted into second side through holes h2.

The third side plate 115 is the plate of the third side surface of the waste heat recovery heat exchanger 100, and connects the first side plate 111 and the second side plate 112.

The fourth side plate 116 is the plate of the fourth side surface of the waste heat recovery heat exchanger 100, and connects the first side plate 111 and the second side plate 112. Accordingly, the third side plate 115 and the fourth side plate 116 are opposite plates that face each other.

The heat exchange tubes 120 are tubes through which the fluid supplied from the water storage tank 300 flows. In the present embodiment, the heat exchange tubes 120 are implemented as heat exchange tubes made of a titanium material.

Generally, when fuel is burnt in the boilers, sulfuric acid is generated due to a sulfuric component. The sulfuric acid is highly corrosive, and thus may corrode the heat exchange tubes inside the heat exchanger, thereby reducing the lifespan of the heat exchange tubes. To overcome this problem, in the present embodiment, the heat exchange tubes 120 are made of a titanium material. The titanium material is highly corrosion resistant to sulfuric acid and has corrosiveness resistance to exhaust gas containing a sulfuric component, and also can maintain continuous thermal conductivity. Accordingly, the titanium material has the advantage of recovering waste heat in boilers using fuel generating corrosive gas, such as B-C oil, diesel or the like. Therefore, even when the temperature of the exhaust gas is reduced to a low temperature equal to or lower than a low-temperature corrosion point (about 50° C.), waste heat can be recovered without the occurrence of corrosion.

Meanwhile, the plurality of heat exchange tubes 120 connects parallel between the first side through holes h1 and the second side through holes h2 opposite the first side through holes h1. Accordingly, as shown in FIG. 5, the plurality of heat exchange tubes 120 connects parallel between the first side plate 111 and the second side plate 112.

For this purpose, the first ends of the heat exchange tubes 120 need to be coupled and fastened into the first side through holes h1 of the first side plate 111, and the second ends of the heat exchange tubes 120 need to be coupled and fastened into the second side through holes h2 of the second side plates 112. Although conventional heat exchange tubes can be fixedly coupled through welding, the heat exchange tubes 120 made of a titanium material according to the present invention have a problem in that the heat exchange tubes 120 cannot be subjected to welding. The reason for this is that thermal deformation easily occurs even when titanium is welded in a vacuum state, and thus a defect, such as distortion or the like, occurs.

Accordingly, according to the present invention, the heat exchange tubes 120 are coupled and fastened using a tube expansion method. In other words, the first ends of the heat exchange tubes 120 are fastened into the first side surface by inserting the first ends of the heat exchange tubes 120 into the first side through holes h1 and expanding the first ends of the heat exchange tubes 120, and the second ends of the heat exchange tubes 120 are fastened into the second side surface by inserting the second ends of the heat exchange tubes 120 into the second side through holes h2 and expanding the second ends of the heat exchange tubes 120. The tube expansion method will be described in conjunction with FIGS. 7 to 10 below.

Meanwhile, the heat exchange tubes 120 through which a fluid is supplied may be grouped into a plurality of sections according to the capacity of the boilers 200. For example, as shown in FIG. 6, the first side through holes h1 may be grouped into three sections, i.e., a first section I, a second section II, and a third section III. The fluid may be supplied only to the heat exchange tubes 120 coupled to the first side through holes h1 located in the first section I, only to the heat exchange tubes 120 coupled to the first side through holes h1 located in the first section I and the second section II, or to all the heat exchange tubes 120 coupled to the first side through holes h1 located in all of the first section I, the second section II and the third section III, according to the capacity of the boilers 200. Accordingly, When the capacity of the boilers 200 is low and thus the temperature of exhaust gas is low or the amount of exhaust gas is small, the fluid may be supplied only to the heat exchange tubes 120 located in the first section I.

Meanwhile, as shown in FIG. 3, the waste heat recovery heat exchanger 100 may further include the separate fluid mixing headers 130. Accordingly, the fluid entering from the water storage tank 300 via a single inflow conduit may be distributed, and may be made to flow through the plurality of heat exchange tubes 120. In the same manner, the fluids discharged through the plurality of heat exchange tubes 120 may be collected, and may be discharged via a single outlet conduit.

Figure 7:
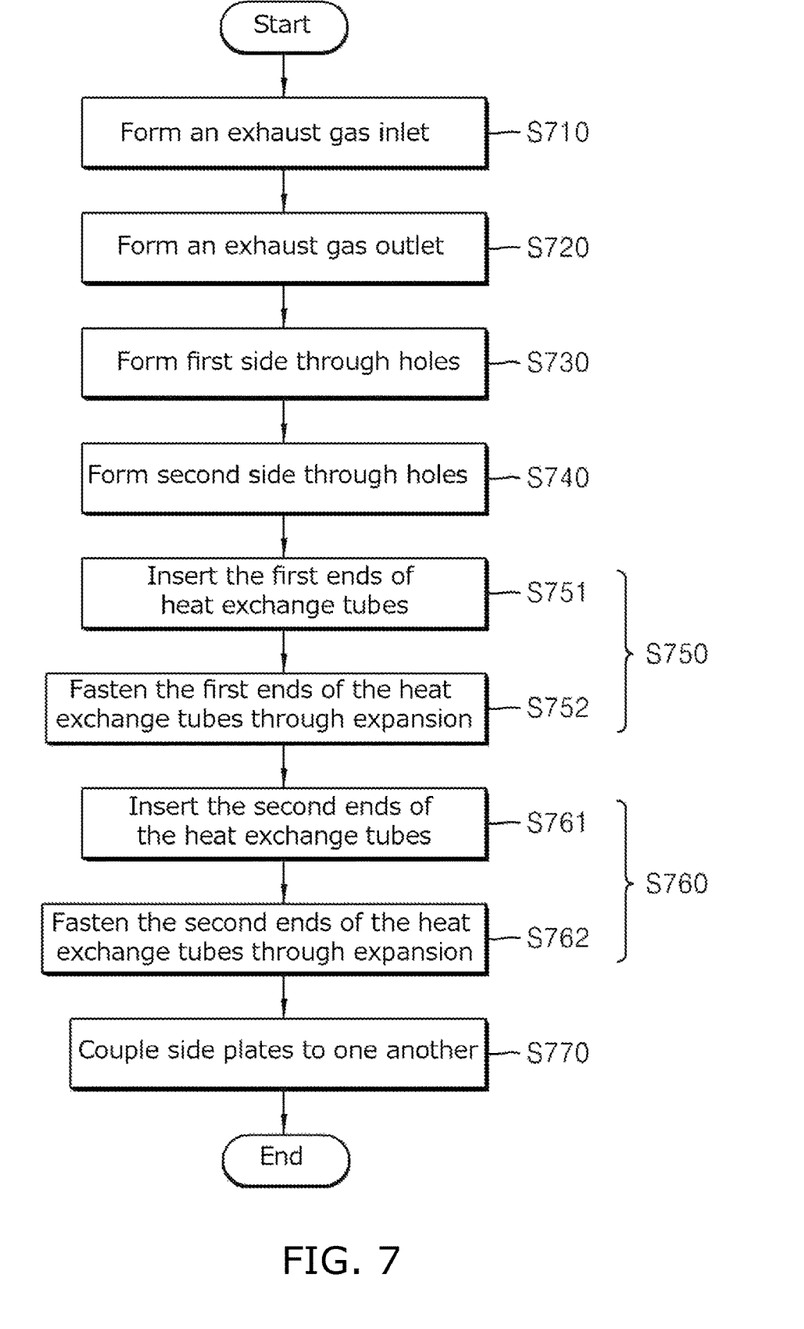
FIG. 7 is a flowchart showing a method of manufacturing a heat exchanger for the recovery of waste heat according to an embodiment of the present invention.
Figure 8:
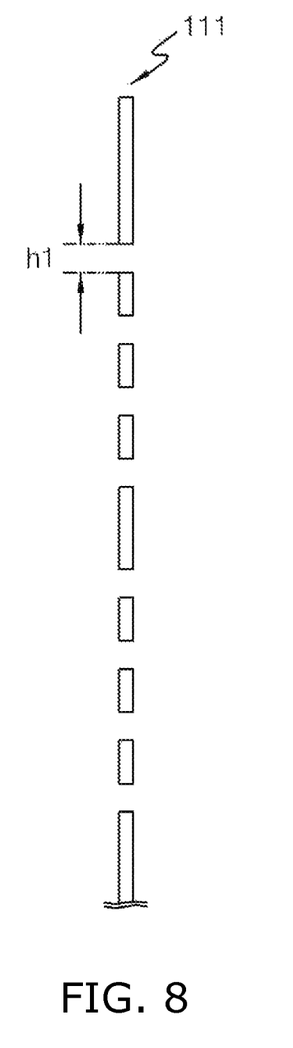
FIG. 8 is a view showing the state in which a plurality of first side through holes is formed through a first side plate according to an embodiment of the present invention.
Figure 9:
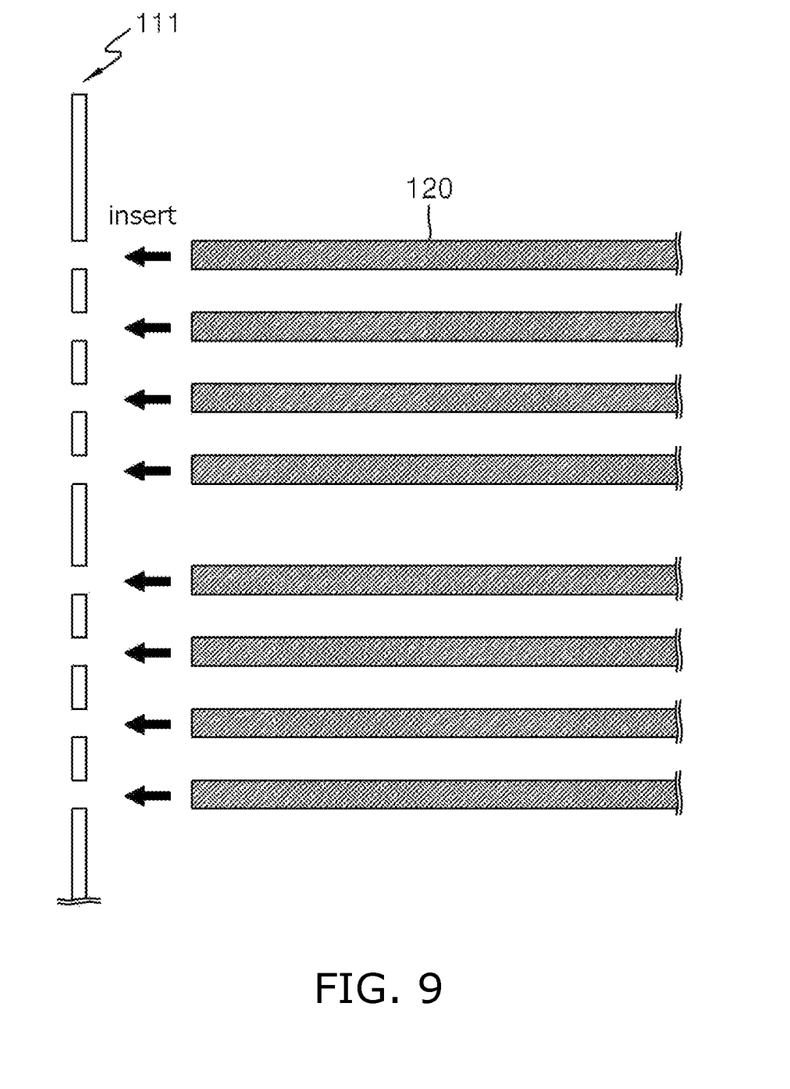
FIG. 9 is a view showing the state in which the first ends of heat exchange tubes are inserted into the first side through holes of the first side plate according to an embodiment of the present invention.
Figure 10:
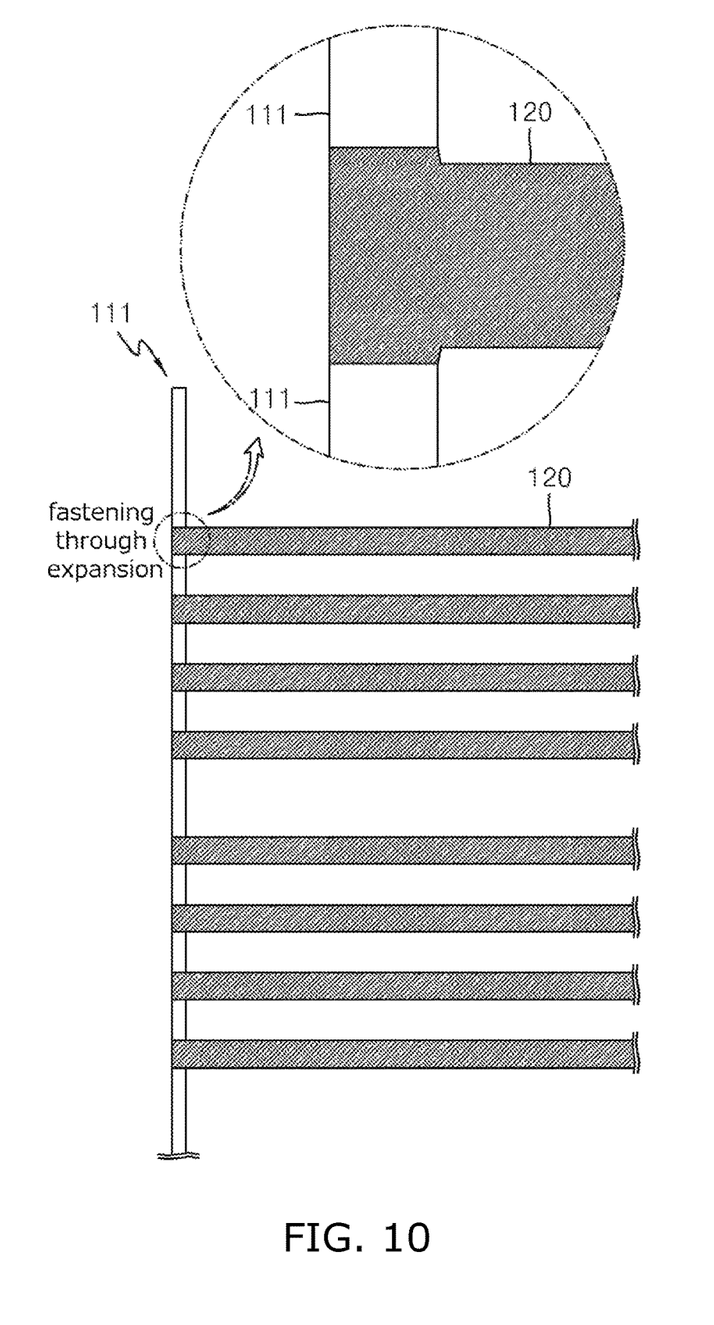
FIG. 10 is a view showing the state in which the first ends of the heat exchange tubes inserted into the first side through holes are expanded according to an embodiment of the present invention.

FIG. 7 is a flowchart showing a method of manufacturing a heat exchanger for the recovery of waste heat according to an embodiment of the present invention, FIG. 8 is a view showing the state in which a plurality of first side through holes is formed through a first side plate according to an embodiment of the present invention, FIG. 9 is a view showing the state in which the first ends of heat exchange tubes are inserted into the first side through holes of the first side plate according to an embodiment of the present invention, and FIG. 10 is a view showing the state in which the first ends of the heat exchange tubes inserted into the first side through holes are expanded according to an embodiment of the present invention.

A method of manufacturing the waste heat recovery heat exchanger 100 configured to recover the thermal energy of exhaust gas generated in the boilers 200 and heat water and to include a housing including the bottom plate 114, the top plate 113, the first side plate 111, the second side plate 112, the third side plate 115, and the fourth side plate 116 includes an exhaust gas inlet formation step S710 of forming an exhaust gas inlet through the inlet bottom plate 114.

The method further includes an exhaust gas outlet formation step S720 of forming an exhaust gas outlet through the top plate 113 at a location opposite that of the exhaust gas inlet.

The method further includes a first side through hole formation step S730 of forming a plurality of first side through holes h1, i.e., a plurality of through holes, through the first side plate 111.

The method further includes a second side through holes formation step S740 of forming a plurality of second side through holes h2 through the second side plate 112 at locations opposite those of the first side through holes h1. For reference, the formation of the exhaust gas inlet, the exhaust gas outlet, the first side through holes, and the second side through holes may be performed by various well-known through hole formation means.

The exhaust gas inlet formation step S710, the exhaust gas outlet formation step S720, the first side through hole formation step S730, and the second side through holes formation step S740 may be performed concurrently or in a different sequence.

The method further includes, after the exhaust gas inlet formation step S710, the exhaust gas outlet formation step S720, the first side through hole formation step S730, and the second side through holes formation step S740, a heat exchange tube first end expansion and fastening step S750 of fastening the first ends of the heat exchange tubes 120 made of a titanium material into the first side plate 111, through which the plurality of first side through holes h1 has been formed, by expanding the first ends of the heat exchange tubes 120.

The method further includes a heat exchange tube second end expansion and fastening step S760 of fastening the second ends of the heat exchange tubes 120 to the second side plate 112, through which the plurality of second side through holes h2 has been formed at locations opposite the first side through holes h1, by expanding the second ends of the heat exchange tubes 120.

The heat exchange tube first end expansion and fastening step S750 is now described in detail. First, the heat exchange tube first end expansion and fastening step S750 includes step S751 of inserting the first ends of the heat exchange tubes 120 made of a titanium material into the first side plate 111 (as shown in FIG. 9), through which the plurality of first side through holes h1 has been formed, as shown in FIG. 8.

Furthermore, as shown in FIG. 10, the heat exchange tube first end expansion and fastening step S750 further includes step S752 of expanding the outer circumferences of the first ends of the heat exchange tubes 120 by applying a preset tube expansion pressure onto the insides of the first ends of the heat exchange tubes 120 by means of a pressurizing device. Accordingly, the outer circumferences of the first ends of the heat exchange tubes 120 are fastened into the first side through holes h1 by pressurizing the first side through holes h1. Accordingly, the heat exchange tubes 120 made of a titanium material may be fastened into the outer circumferences of the first side through holes h1 of the first side plate 111 by pressurizing and being tightly fitted into the outer circumferences of the first side through holes h1 without separate welding. For reference, referring to FIG. 10, it can be seen that the outer circumferences of the first ends of the heat exchange tubes 120 are expanded by the pressurization, and thus the outer diameter of the first ends of the heat exchange tubes 120 becomes larger than the outer diameter of other regions.

Like the heat exchange tube first end expansion and fastening step S750, the heat exchange tube second end expansion and fastening step S760 includes step S761 of inserting the second ends of the heat exchange tubes 120 into the second side plate 112 through which the second side through holes h2 are formed at locations opposite those of the first side through holes h1, and step S762 of fastening the outer circumferences of the second ends of the heat exchange tubes 120 into the outer circumferences of the second side through holes h2 by expanding the outer circumferences of the second ends of the heat exchange tubes 120 through the application of a preset tube expansion pressure onto the insides of the second ends.

Through the heat exchange tube first end expansion and fastening step S750 and the heat exchange tube second end expansion and fastening step S760, the plurality of heat exchange tubes 120 that parallel connect between the first side through holes h1 and the second side through holes h2 opposite the first side through holes h1 may be disposed. After the heat exchange tube first end expansion and fastening step S750 and the heat exchange tube second end expansion and fastening step S760 have been performed, the waste heat recovery heat exchanger 100 is finally manufactured by coupling the bottom plate 114, the top plate 113, the first side plate 111, the second side plate 112, the third side plate 115, and the fourth side plate 116 to one another at step S770.

Meanwhile, the fastening of the first ends of the heat exchange tubes 120 through expansion and the fastening of the second ends of the heat exchange tubes 120 through expansion may be separately performed, or may be concurrently performed using the same pressure for corresponding locations.

The heat exchange tube first end expansion and fastening step S750 and the heat exchange tube second end expansion and fastening step S760 may be concurrently performed for each of the heat exchange tubes 120 by using the same tube expansion pressure.

Meanwhile, during the fastening of the first and second ends of the heat exchange tubes 120 through expansion, a pressurizing device is inserted into the first or second end of each of the heat exchange tubes 120, and then performs pressurization to expand the first or second end of each of the heat exchange tubes 120. This pressurization is performed using a preset tube expansion pressure. Meanwhile, this tube expansion pressure needs to be lower than the deformation pressure of the first side plate 111 and the second side plate 11. The reason for this is that, although the first side plate 111 through which the first side through holes h1 have been formed and the second side plate 112 through which the second side through holes h2 have been formed are made of a metallic material, there is concern that the first side through holes h1 or second side through holes h2 may be deformed when a pressure higher than the deformation pressure is applied thereto during the fastening through expansion. Accordingly, it is preferable to perform the pressurization by using a tube expansion pressure lower than the deformation pressure that deforms the metallic material of the first side plate 111 and the second side plate 112.

According to an embodiment of the present invention, the heat exchange tubes can be prevented from being corroded and the thermal efficiency of the heat exchanger can be uniformly maintained by applying the heat exchange tubes made of a titanium material to the heat exchanger for the recovery of waste heat. Accordingly, the system for the recovery of waste heat, to which the heat exchanger for the recovery of waste heat is applied, according to the present invention can maximize the effect of reducing fuel consumption. Furthermore, cold water can be supplied and heated, and thus the difference in temperature between the entrance and exit of the heat exchanger can be increased, thereby improving the efficiency of heat exchange.

The above-described embodiments of the present invention are preferred examples that are selected to assist those skilled in the art in understanding the present invention. The technical spirit of the present invention is not limited only to theses embodiments. Various modifications and alterations and other equivalent embodiments can be made without departing from the technical spirit of the present invention.

What is claimed is:

1. A heat exchanger for recovery of waste heat, which is configured to recover thermal energy of exhaust gas generated in a boiler and heat water, the heat exchanger comprising:
a bottom plate configured such that an exhaust gas inlet is formed therethrough;
a top plate configured such that an exhaust gas outlet is formed therethrough at a location opposite that of the exhaust gas inlet;
a first side plate configured such that a plurality first side through holes is formed therethrough;
a second side plate disposed opposite the first side plate, and configured such that a plurality of second side through holes is formed therethrough at locations opposite those of the first side through holes;
a third side plate and a fourth side plate configured to connect the first side plate and the second side plate;
a plurality of heat exchange tubes formed as titanium material tubes through which a fluid flows, and configured to connect parallel between the first side through holes and the second side through holes opposite the first side through holes; and
fluid mixing headers installed on the first side plate and the second side plate, respectively;
wherein the heat exchange tubes are fastened to the first side plate by inserting first ends thereof into the first side through holes and expanding the first ends, and are fastened to the second side plate by inserting second ends thereof into the second side through holes and expanding the second ends; and
wherein the heat exchange tubes through which the fluid is supplied are grouped into a plurality of sections according to capacity of the boiler.

2. A method of manufacturing a heat exchanger for recovery of waste heat, which is configured to manufacture the heat exchanger of claim 1, the method comprising:
an exhaust gas inlet formation step of forming the exhaust gas inlet through the bottom plate;
an exhaust gas outlet formation step of forming the exhaust gas outlet through the top plate at a location opposite the exhaust gas inlet;
a first side through hole formation step of forming the plurality of first side through holes through the first side plate;
a second side through holes formation step of forming the plurality of second side through holes through the second side plate at locations opposite those of the first side through holes;
a heat exchange tube first end expansion and fastening step of fastening the first ends of the heat exchange tubes made of a titanium material to the first side plate, through which the plurality of first side through holes have been formed, by expanding the first ends of the heat exchange tubes;
a heat exchange tube second end expansion and fastening step of fastening the second ends of the heat exchange tubes to the second side plate, through which the plurality of second side through holes are formed at locations opposite those of the first side through holes, by expanding the second ends of the heat exchange tubes; and
a step of coupling the bottom plate, the top plate, the first side plate, the second side plate, the third side plate, and the fourth side plate to one another.

3. The method of claim 2, wherein the heat exchange tube first end expansion and fastening step comprises the steps of:
inserting the first ends of the heat exchange tubes made of a titanium material into the first side plate through which the plurality of first side through holes have been formed; and
fastening outer circumferences of the first ends of the heat exchange tubes into outer circumferences of the first side through holes by expanding the outer circumferences of the first ends of the heat exchange tubes through application of a preset tube expansion pressure onto insides of the first ends of the heat exchange tubes.

4. The method of claim 3, wherein the heat exchange tube second end expansion and fastening step comprises the steps of:
inserting the second ends of the heat exchange tubes into the second side plate through which the plurality of second side through holes have been formed at locations opposite those of the first side through holes; and
fastening outer circumferences of the second ends of the heat exchange tubes into outer circumferences of the second side through holes by expanding the outer circumferences of the second ends of the heat exchange tubes through application of a preset tube expansion pressure onto insides of the second ends of the heat exchange tubes.

5. The method of claim 4, wherein the heat exchange tube first end expansion and fastening step and the heat exchange tube second end expansion and fastening step are concurrently performed on each of the heat exchange tubes by using an identical tube expansion pressure.

6. The method of claim 4, wherein the first side plate and the second side plate are made of a metallic material, and the expansion is performed using a tube expansion pressure lower than a deformation pressure of the first side plate and the second side plate made of the metallic material.

* * * * *